(12) United States Patent
Astoria et al.

(10) Patent No.: US 10,384,145 B2
(45) Date of Patent: Aug. 20, 2019

(54) EVAPORATOR

(71) Applicant: Nederman Holding AB, Helsingborg (SE)

(72) Inventors: Jessica L. Astoria, Harrisburg, NC (US); John W. Fields, North Myrtle Beach, SC (US); James W. Horton, Jr., Charlotte, NC (US)

(73) Assignee: NEDERMAN HOLDING AB (SE)

( * ) Notice: Subject to any disclaimer, the term of this patent is extended or adjusted under 35 U.S.C. 154(b) by 262 days.

(21) Appl. No.: 15/289,501

(22) Filed: Oct. 10, 2016

(65) Prior Publication Data

US 2017/0106310 A1    Apr. 20, 2017

(30) Foreign Application Priority Data

Oct. 19, 2015    (EP) ..................................... 15190329

(51) Int. Cl.
*B01D 1/08*    (2006.01)
*B01D 1/02*    (2006.01)
(Continued)

(52) U.S. Cl.
CPC ............. *B01D 1/08* (2013.01); *B01D 1/0017* (2013.01); *B01D 1/0041* (2013.01);
(Continued)

(58) Field of Classification Search
CPC .. B01D 1/0017; B01D 1/0041; B01D 1/0064; B01D 1/02; B01D 1/08; B01D 1/225; F28D 11/02; F28D 2021/0064; F28D 7/024; F28D 7/106; F28F 2270/00; F28F 27/02; F28F 5/02
See application file for complete search history.

(56) References Cited

U.S. PATENT DOCUMENTS 3,489,651 A    1/1970    De Pas
4,053,006 A    10/1977    Tkac et al.
(Continued)

FOREIGN PATENT DOCUMENTS

DE    1161852 B    1/1964
DE    4000311 A1    7/1990
JP    H01258702 A    10/1989

OTHER PUBLICATIONS

English Translation of DE4000311 to M. Schick (Year: 2018).*

*Primary Examiner* — Renee Robinson
*Assistant Examiner* — Derek N Mueller
(74) *Attorney, Agent, or Firm* — Condo Roccia Koptiw LLP

(57) ABSTRACT

The invention relates to an evaporator. The evaporator may include a drum. The drum may have a first portion and a second portion. The drum may include a product inlet positioned at the first portion of the drum, a product outlet positioned at the second portion of the drum, a vapor outlet, and an agitator. The evaporator may have a heating jacket and/or a product supply pipe. The heating jacket may be configured to surround the drum and/or to heat the product in the drum. The product supply pipe may be positioned outside the drum and/or may extend from the second portion of the drum to the product inlet positioned at the first portion of the drum. The product supply pipe may be in direct contact with the heating jacket.

10 Claims, 5 Drawing Sheets

(51) Int. Cl.
*F28D 7/10* (2006.01)
*B01D 1/00* (2006.01)
*B01D 1/22* (2006.01)
*F28F 5/02* (2006.01)
*F28F 27/02* (2006.01)
*F28D 7/02* (2006.01)
*F28D 11/02* (2006.01)
*F28D 21/00* (2006.01)

(52) U.S. Cl.
CPC ............. *B01D 1/0064* (2013.01); *B01D 1/02* (2013.01); *B01D 1/225* (2013.01); *F28D 7/024* (2013.01); *F28D 7/106* (2013.01); *F28D 11/02* (2013.01); *F28F 5/02* (2013.01); *F28F 27/02* (2013.01); *F28D 2021/0064* (2013.01); *F28F 2270/00* (2013.01)

(56) References Cited

U.S. PATENT DOCUMENTS

| | | |
|---|---|---|
| 5,425,849 A | 6/1995 | Feres |
| 7,591,930 B2 | 9/2009 | Glasl et al. |
| 2005/0069820 A1* | 3/2005 | Nomura ................ B01D 1/225 430/398 |
| 2006/0231378 A1 | 10/2006 | Wolfgang et al. |
| 2011/0100561 A1 | 5/2011 | Alasti et al. |

* cited by examiner

EVAPORATOR

RELATED APPLICATIONS

This application claims the benefit of European Patent Application No. 15190329.1, filed Oct. 19, 2015, the contents of which are hereby incorporated by reference in their entirety.

FIELD OF THE INVENTION

The present invention relates to an evaporator and preferably an agitated thin film evaporator, a wiped film evaporator, a short-path evaporator, or a thin film dryer.

BACKGROUND OF THE INVENTION

Typically a thin film evaporator comprises a vertical or horizontal drum, a supply line which is used to supply the product that is to be evaporated, a heating jacket arranged on the periphery of the drum, a discharge line for discharging the residue left and a discharge line for discharging the evaporated portion of the product. The overall purpose of the thin film evaporator is to evaporate volatile fluids from less volatile fluids. The evaporation occurs by the contact between the product and the heated walls of the drum. To improve the evaporation efficiency, the drum is provided with an agitation means. The agitation may be made in a number of ways. One well known type is an agitator of the fixed clearance type in which a thin gap is formed between the agitator and the inner wall of the drum, whereby the agitator during rotation forces the product towards the thin gap. Another type is a so called wiped film agitator, in which the agitator wipes the product against the inner wall of the drum, thereby forming a thin product film.

Conventionally, the only way to add heating surface is either to make the drum diameter larger or to make the drum longer. This adds to the bulkiness and cost of the evaporator.

It is also possible to increase the capacity and reduce energy consumption by adding a separate, stand alone pre-heater, e.g. a heat exchanger, to the process. Thereby the product is preheated before it enters the drum. The stand alone pre-heater is arranged in a position upstream the evaporator.

Typically, the inside heated wall of a thin film evaporator is designed a lot thicker than most heat exchangers due to the relatively large inside diameter as compared to a standard shell and tube heat exchanger. To compensate for the larger wall thickness and reduced heat transfer caused thereby while still allowing a speedy evaporation with short residence time as the product meets the heated inner wall of the drum, the heating medium used in the heating jacket often has a large temperature difference when entering the drum. However, this causes the drawback of losing energy to the outside environment via the wall portion of the heating jacket which faces away from the drum unless that wall is thoroughly insulated. In fact, even with a thorough insulation undue and costly energy losses will occur.

These problems are equally applicable to a so called short path evaporator. A short path evaporator basically consists of a cylindrical drum with a heating jacket, an agitator and a condenser inside. The agitator creates by rotation a thin product film on the heating surface inside of the drum. By means of gravity the product flows in a spiral path downwards, whereby the volatile portion of the product evaporates. The vapors passes the shortest route and with practically no pressure drop to the internal condenser where it is condensed. The non-volatile portion reaches the lower portion of the drum and leaves it via a product outlet. Like in prior art agitated thin film evaporators or wiped film evaporators, it is well established technology to use a stand-alone pre-heater which is arranged in a position upstream of the evaporator to thereby feed the evaporator with a preheated product.

Thus, there is a need for a more energy efficient solution with reduced energy losses. Also there is a need to reduce the overall cost of an installation by allowing reducing or even eliminating the need for an external pre-heater. The technology should be equally applicable no matter if it is applied to an agitated thin film evaporator, a wiped film evaporator, a short path evaporator or a thin film dryer.

SUMMARY OF THE INVENTION

It is noted that the invention relates to all possible combinations of features recited in the claims.

According to a first aspect, the invention relates to an evaporator, preferably an agitated thin film evaporator, a wiped film evaporator, a short-path evaporator or a thin film dryer, comprising a drum. The drum comprises a product inlet arranged in a first portion of the drum, a product outlet arranged in a second portion of the drum, a vapor outlet, and an agitator. A heating jacket is arranged to surround the drum and adapted to heat the product in the drum. The evaporator is characterized in the evaporator further comprising a product supply pipe, being arranged outside the drum and extending from the second portion of the drum to the product inlet in the first portion of the drum, and the product supply pipe being arranged in direct contact with the heating jacket.

By arranging the product supply pipe in direct contact with the heating jacket inevitable heat losses from the heating jacket may be used to preheat the product to be supplied to the drum to be evaporated therein. Thereby any stand-alone pre-heater in a position upstream the evaporator may be eliminated. This allows a cost reduction in terms of investments but also a cost reduction in energy consumption. Also the foot print of an installation may be reduced.

The product supply pipe is arranged on the exterior side of the drum, whereby the principle is applicable no matter of type of evaporator as long as the evaporator is provided by a heating jacket. Thereby the invention is equally applicable no matter if the evaporator is of the agitated thin film evaporator type, a wiped film evaporator, a short path evaporator type or a thin film dryer type.

The inventive solution also allows for cost savings since the number of pressure vessels and pressure relief valves may be reduced, steam traps may be eliminated and the extent of external piping may be reduced. Yet another advantage is that the complexity of control and monitoring may be facilitated since there is only one heating loop to control.

The product supply pipe may be formed as a tube, coiling around along the longitudinal extension of the drum. By providing the product supply pipe as a tube, any pressure losses may be reduced. Further, by the coiling, the contact surface between the product supply pipe and the drum will be enhanced.

The product supply pipe may be formed as a tube, coiling around along an exterior side wall of the heating jacket. Thereby there will be provided a heat transfer between the heating jacket and the product supply pipe which heat transfer will be constituted by waste energy that otherwise would go to waste into the ambient air.

The product supply pipe may be formed as a tube, coiling around along the longitudinal extension of the drum, and the heating jacket is arranged as a tube, coiling around along the longitudinal extension of the drum, and wherein the tube forming the product supply pipe and the tube forming the heating jacket may be arranged to coil side by side around and along the longitudinal extension of the drum. By the tubes co-coiling side by side there will be an increased contact surface between the two tubes and between the tubes and the heating jacket thereby allowing an improved heat transfer. The co-coiling may be provided in a number of patterns. By way of example the turns may be stacked in a strict vertical manner along the longitudinal extension of the drum or be displaced as seen in a direction transverse the longitudinal extension of the drum.

The product supply pipe may be provided by a double walled pre-heating jacket which is formed by two opposing wall portions together defining a through duct between themselves, and wherein the double walled pre-heating jacket is arranged to enclose and be in direct contact with the heating jacket. In this embodiment a continuous, gap free heating contact between the double walled pre-heating jacket and the heating jacket is made possible.

The product supply pipe may be integrated in the heating jacket. The product supply pipe may be fully or partly embedded in the heating jacket.

The outer most wall of the product supply pipe may be thermally insulated to thereby reduce heat losses. The insulation may by way of example be provided as a thermally insulating shell.

The product supply pipe may comprise baffles. By baffles a highly turbulent flow may be provided for, thereby improving the efficiency of preheating the product supply before reaching the inlet of the drum.

The heating jacket may by way of example be heated by electric heating elements or a heated fluid. The heated fluid may by way of example be hot oil, steam or water.

The interface between the product supply pipe and the product inlet in the first portion of the drum may comprise a distributor adjacent the product inlet in the first portion of the drum, the distributor being adapted to distribute the product across a cross section of the drum as seen transverse the longitudinal extension thereof. The distributor may provide for a uniform distribution of the preheated product along the circumference of the inner wall of the drum already adjacent the inlet. Thereby the overall efficiency of the evaporator may be improved.

According to another aspect the invention relates to the use of an evaporator of the design previously discussed.

BRIEF DESCRIPTION OF THE DRAWINGS

The above as well as additional objects, features and advantages of the present invention, will be better understood through the following illustrative and non-limiting description of preferred embodiments of the present invention, with reference to the appended drawings where the same reference numbers will be used for similar elements.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

To facilitate the understanding, the description given below will be based on a vertically arranged drum. It goes without saying the drum equally well may be horizontally arranged.

Figure 1:
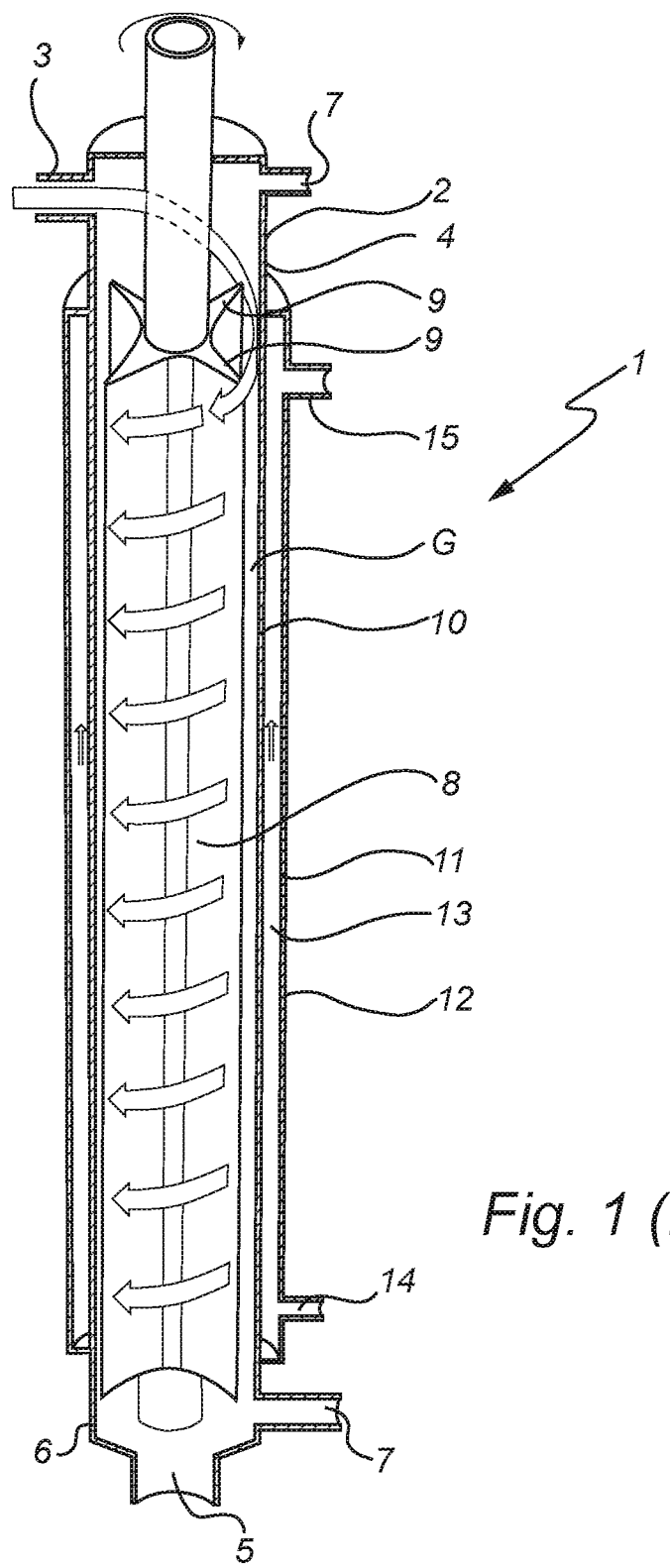
FIG. 1 discloses the overall design and principle of an agitated thin film evaporator according to prior art.

Referring to FIG. 1 the overall design and principle of an agitated thin film evaporator according to prior art is disclosed. The evaporator 1 comprises a vertical drum 2 having a generally cylindrical extension and a generally circular cross section as seen in a direction transverse the longitudinal extension thereof. The drum 2 has a product inlet 3 arranged in a first upper portion 4 thereof and a product outlet 5 arranged in a second lower portion 6 thereof. The product outlet 5 is preferably arranged in the lower most portion in order of allowing a complete emptying of the drum 2. As a non-limiting example the drum 2 may have a diameter of 400 mm-1500 mm and a vertical length of 2-10 meters.

The drum 2 further comprises a vapor outlet 7. The vapor outlet 7 may be arranged in the first portion 4 and/or the second portion 6 depending on if the evaporator 1 is arranged to operate with a counter-current or co-current vapor flow. In the disclosed embodiment one vapor outlet 7 is arranged in the upper portion 4 and one vapor outlet 7 is arranged in the lower portion 6 to allow both types of flows.

In the disclosed embodiment an agitator 8 of the fixed clearance type is used. The agitator 8 is concentrically arranged inside the drum 2. The agitator 8, which may be seen as a rotor, is arranged to be rotated inside the drum 2 by a motor (not disclosed). The agitator 8 is provided with blades 9 extending along the longitudinal extension of the agitator 8. The blades 9 provide a cross section as seen transverse the longitudinal extension of the agitator 8 that is slightly smaller than the inner diameter of the inner wall 10 of the drum 2. There by a gap G is formed between the blades 9 and the inner wall 10 of the drum 2. The gap G is preferably in the range of 0.3-5 mm and more preferred in the range of 0.5-1 mm. The purpose of the gap G is to allow formation of a thin film of the product along the inner wall 10 of the drum 2 as the agitator 8 rotates. Also, by the agitator 8 a highly turbulent flow, resulting in optimum heat flux and mass transfer may be provided for as the product transfers from the inlet 3 to the outlet 5.

A heating jacket 11 is arranged on the exterior side of the vertical drum 2. The heating jacket 11 preferably extends along the full circumference of the drum 2. The heating jacket 11 may be heated in a number of ways, well known to the skilled person, such as by electricity, hot oil, steam or water.

In the disclosed embodiment the heating jacket 11 is arranged as a double walled jacket 12 defining a circumferential duct 13 with uniform thickness extending along the full longitudinal extension of the jacket. The heating jacket 11 is provided with a heating medium inlet 14 and a heating medium outlet 15 allowing supply of a heating fluid to the duct 13.

The heating fluid may by way of example be hot oil, hot water or steam. The flow may either be co-current or counter-current in view of the product flow in the drum. In the disclosed embodiment the flow is counter-current.

As an alternative to a heating fluid, the heating jacket may be electrically heated by using electric heating elements. The heating elements may by way of example be integrated in a structure forming a heating jacket enclosing the circumference of the outer wall of the drum or be integrated in the wall of the drum.

No matter design of the heating jacket, the purpose is to heat the inner wall of the drum 2 to a temperature sufficiently high to cause a speedy evaporation of the product contacting the same during operation of the evaporator.

During operation, the product to be processed is arranged to enter the drum 2 via the product inlet 3 in the upper portion 4. The product is evenly distributed across the inner wall 10 of the drum 2 by the agitator 8. As the product spirals down along the gap G that is formed between the agitator 8 and the inner wall 10 of the drum 2, bow waves developed by the blades 9 of the agitator 8 generate highly turbulent flow, resulting in heat flux and mass transfer. By the contact between the product and the heated inner wall 10 of the drum 2, volatile components of the product are rapidly evaporated. Vapors flow either counter-currently or co-currently through the drum 2, depending on the application. In both cases the vapors formed are ready for condensing or subsequent processing. Non-volatile components are discharged via the product outlet 5.

It is to be understood that the design of the system must consider many variables such as feed rate, temperature, vacuum, rotor speed, wall thickness of the drum, construction materials and the physical and thermodynamic properties of the product. Also, depending on type of agitation, blade design and blade clearance are examples of parameters to consider. It goes without saying that these variables are interrelated in how they affect performance. Accordingly it is impossible to give relevant exemplifying process parameters.

Now turning to FIG. 2, a first embodiment of the invention will be described. The overall design of the evaporator 1 is the same as that previously discussed in view of FIG. 1 whereby reference is made to the description given above. As a difference in view of prior art, the inventive evaporator further comprises a product supply pipe 20.

In its broadest sense, the product supply pipe 20 is arranged outside the drum 2 and extends from the lower portion 6 of the drum 2 to the product inlet 3 in the upper portion 4 of the drum 2. Thus, the product supply pipe 20 is arranged to provide a flow direction being counter-current to that of the product flow inside the drum 2.

The product supply pipe 20 comprises an inlet portion 21 and an outlet portion 22. The inlet portion 21 is arranged to be connected directly or indirectly to a source (not disclosed) from which the product is to be supplied. Further, the outlet portion 22 is arranged to be connected to the product inlet 3 of the drum 2.

It goes without saying that the outlet portion may be provided as a distributor in the form of a manifold, whereby the preheated product leaves the product supply pipe from two or more outlet portions and enters the drum via two or more product inlets. The two or more outlets portions and product inlets may be evenly distributed along the circumference of the drum.

In the disclosed embodiment a valve 23 is arranged in that interface. It goes without saying that the skilled person may provide the system with a plurality of back-pressure valves or the like to allow a proper control.

The exterior wall 20a of the product supply pipe 20 facing the longitudinal centerline L of the drum 2 is arranged in direct contact with the heating jacket 11. The term direct contact is to be interpreted as a physical contact in which the heating energy provided by the heating jacket 11 may be transferred to the exterior wall 20a of the product supply pipe 20 to thereby allow preheating of the product supplied to the drum 2 via the product supply pipe 20.

The exterior wall 20b of the product supply pipe 20 facing away from the longitudinal center line L of the drum 2 may be thermally insulated to reduce heat losses. An insulation 24 may be provided as a thermally insulating shell.

The product supply pipe 20 may be formed in a number of ways within the scope of the invention. In the embodiment disclosed in FIG. 2, the product supply pipe 20 is provided by a double walled pre-heating jacket 30 which is formed by the two opposing walls 20a, 20b which together define a through duct 26 between themselves. In its most simple form, not disclosed, the wall 20a may be omitted and shared by the heating jacket 11. The duct 26 has a uniform cross section as seen in a direction transverse the longitudinal centerline L of the drum 2. The double walled pre-heating jacket 30 and the duct 26 formed thereby will hence extend coaxially with the drum 2 in a position outside the drum 2. Thus the double walled pre-heating jacket 30 encloses the heating jacket 11.

The inner most wall 20a of the double walled pre-heating jacket 30 is arranged in direct contact with the outer most surface of the heating jacket 11. Thereby the product supply will be pre-heated by the heat from the heating jacket 11 as the product supply passes the duct 26 on its way to the drum 2.

At least the outer most wall 20b of the double walled pre-heating jacket 30 may be arranged as one or several removable sections (not disclosed) to facilitate maintenance and especially cleaning of the product supply pipe.

One or both opposing walls 20a, 20b of the double walled pre-heating jacket 30 may be provided with baffles 31 or any surface irregularities to provide a turbulent flow.

Figure 3:
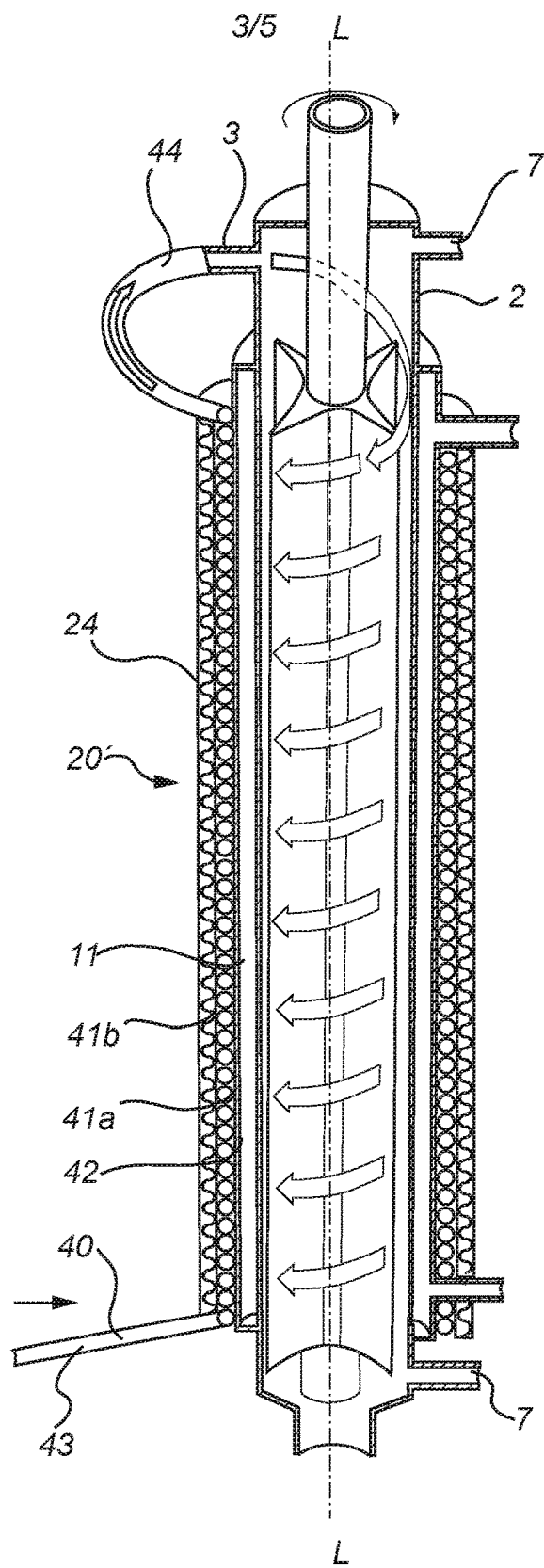
FIG. 3 discloses a second embodiment of the present invention applied to an agitated thin film evaporator.

Now turning to FIG. 3, a second embodiment of the design of the product supply pipe 20' is disclosed. The product supply pipe 20' is arranged as a tube 40 coiling around along the longitudinal extension of the drum 2. More precisely, the outer wall portion 41a of the tube 40 making up the product supply pipe 20' and facing the longitudinal center line L of the drum 2 is arranged in direct contact with the outer wall 42 of the heating jacket 11 facing away from the longitudinal center line L of the drum 2.

The product supply pipe 20' comprises an inlet portion 43 and an outlet portion 44. The inlet portion 43 is arranged to be connected directly or indirectly to a source (not disclosed) from which the product is to be supplied. Further, the outlet portion 44 is arranged to be connected to the product inlet 3 of the drum 2. Thus, the product supply pipe 20' is arranged to provide a flow direction being counter-current to that of the product flow inside the drum 2.

The product supplied through the product supply pipe 20' will be preheated by the heat from the heating jacket 11 as the product supply passes the product supply pipe 20' on its way to the drum 2.

The product supply pipe 20' is preferably made of a material exhibiting high heat conductivity, such as carbon steel or durability and corrosion resistance, such as stainless steel.

The outer wall portion 41b of the product supply pipe 20' facing away from the longitudinal center line L of the drum 2 may be thermally insulated to reduce heat losses. The insulation 24 may be provided as a thermally insulating shell.

This embodiment is applicable no matter how the heating jacket is heated.

Figure 4A:
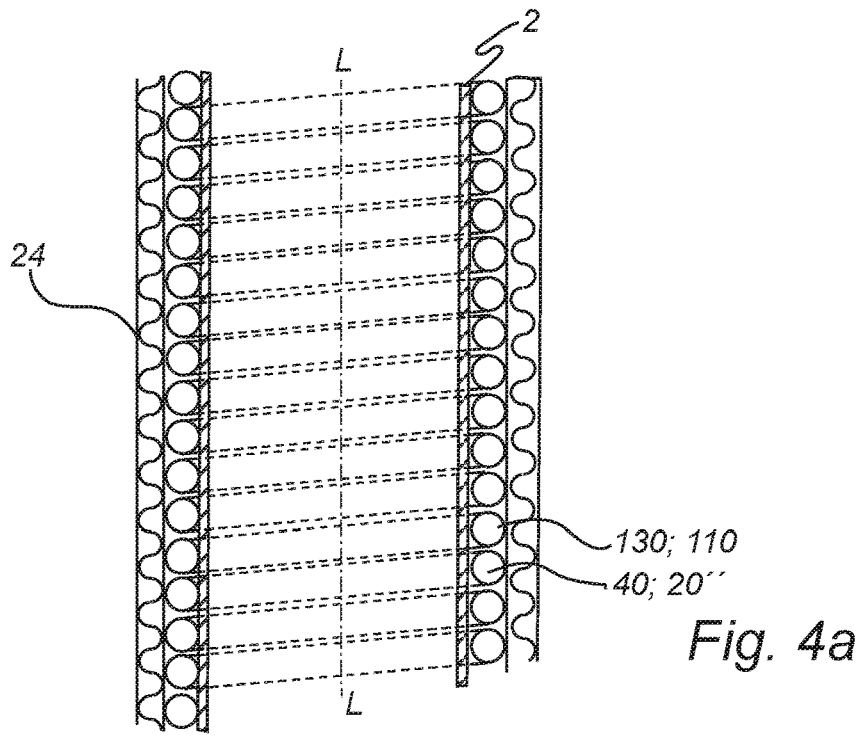
FIGS. 4a, 4b, 4c discloses yet another embodiments of the invention using tubes coiling along the longitudinal extension of the drum.

Now turning to FIG. 4a, a third embodiment of the invention is disclosed highly schematically. As a difference from the previous embodiments, the heating jacket 110 is arranged as tube 130 coiling around along the longitudinal extension of the drum 2. Further, the product supply pipe 20" is arranged as a tube 40 coiling around and upwardly along the longitudinal extension of the drum 2. The tube 40 forming the product supply pipe 20" and the tube 130 forming the heating jacket 110 are arranged to coil side by side in a strictly vertically stacked manner where a turn of the product supply tube 40 is received between two successive turns of the tube 130 forming the heating jacket 110. This type of coiling may be seen as a co-coiling.

Figure 4B:
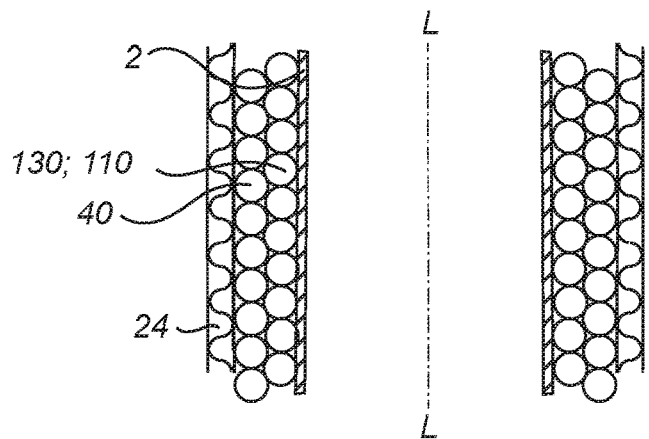

It goes without saying that other patterns of co-winding are possible. By way of example, see FIG. 4b, the tube 130 making up the heating jacket 110 may be wound with each turn along the longitudinal axis stacked and in contact with each other, while each turn of the product supply tube 40 is received in the resulting cavity formed in the interface between two consecutive turns of the tube 130 forming the heating jacket 110. In such embodiment there is a radial displacement of the centre axis of the two tubes 40, 130 in view of the longitudinal center axis L of the drum 2.

Like in previous embodiments an insulation 24 may be provided as a thermally insulating shell.

Figure 4C:
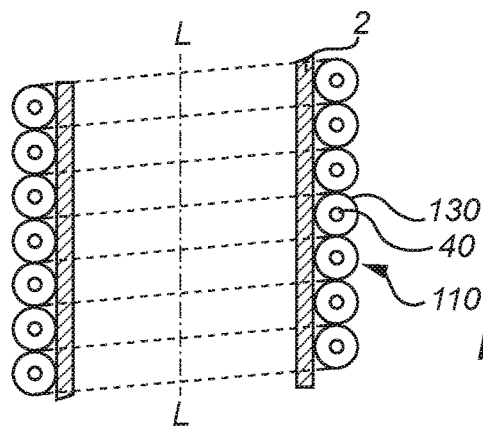

The product supply pipe may be integrated in the heating jacket. The product supply pipe may be fully or partly embedded in the heating jacket. One such embodiment is disclosed highly schematically in FIG. 4c, where the product supply pipe 40 is arranged coaxially inside the tube 130 making up the heating jacket 110. The tube 130 together with the product supply pipe is coiling around and along the longitudinal extension of the drum 2.

The invention with its embodiments has been illustrated and described based on an agitated thin film evaporator using an agitator of the so called fixed clearance type. The invention with its embodiments is equally applicable to a so called wiped film evaporator. A wiped film evaporator differs from an agitated thin film evaporator in that the agitator is replaced by a so called wiped film agitator. The latter agitator type wipes during rotation the product against the inner wall of the drum, thereby forming a thin product film to be evaporated.

The very same principle of the invention with its embodiments as described above applied to a thin film evaporator applies to a thin film dryer. The essential difference between the two is that the evaporation is continued to such extent that a dry material may be discharged via the product exit.

The invention with its embodiments is equally applicable to a so called short path evaporator or a so called thin film dryer.

Figure 2:
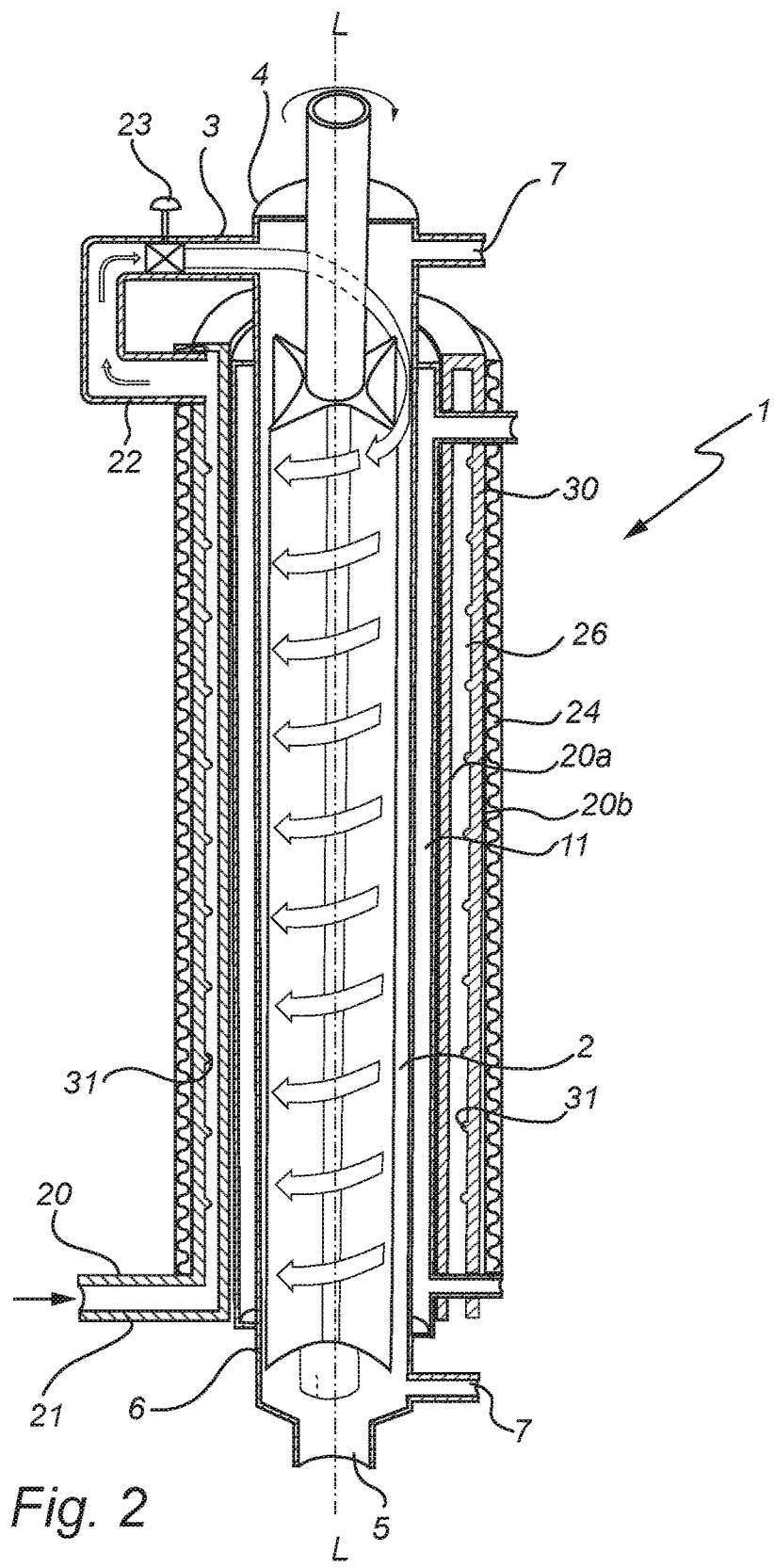
FIG. 2 discloses a first embodiment of the present invention applied to an agitated thin film evaporator.
Figure 5:
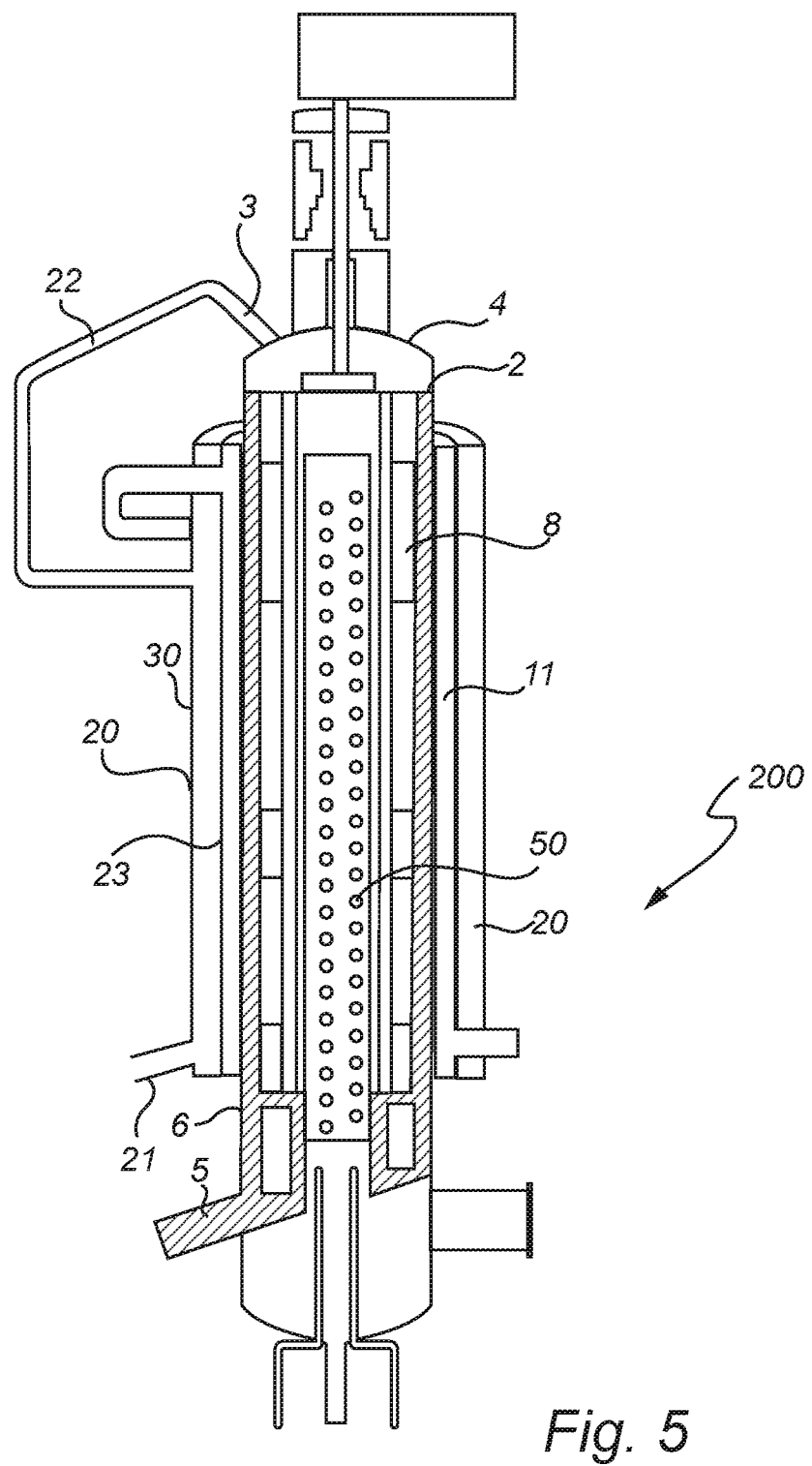
FIG. 5 discloses one embodiment with the invention applied to an evaporator of the short path type.

FIG. 5 discloses the embodiment of FIG. 2 applied to a short path evaporator. A short path evaporator 200 basically consists of a cylindrical drum 2 with a heating jacket 11, an agitator 8 and a condenser 50 inside. The agitator 8 creates by rotation a thin product film on the heating surface inside of the drum. By means of gravity the product flows in a spiral path downwards, whereby the volatile portion of the product evaporates. The vapors passes the shortest route and with practically no pressure drop to the internal condenser 50 where it is condensed. The non-volatile portion reaches the lower portion of the drum 2 and leaves it via a product outlet 5.

A product supply pipe 20 in the form of a double walled pre-heating jacket 30 is arranged outside the drum 2 and extends from the lower portion 6 of the drum 2 to the product inlet 3 in the upper portion 4 of the drum 2. The product supply pipe 20 comprises an inlet portion 21 and an outlet portion 22. The inlet portion 21 is arranged to be connected directly or indirectly to a source (not disclosed) from which the product is to be supplied. Further, the outlet portion 22 is arranged to be connected to the product inlet 3 of the drum 2. The exterior wall 23 of the product supply pipe 20 facing the longitudinal centerline L of the drum 2 is arranged in direct contact with the heating jacket 11.

Although not disclosed, the duct formed by the double walled pre-heating jacket making up the product supply pipe 20 may be divided into vertically extending sections (not disclosed) as seen along the circumference of the drum. Each section extends essentially in parallel with the longitudinal center axis of the drum and may be provided with its own inlet and its own outlet.

The plurality of inlets may meet in a common inlet manifold. Likewise, the plurality of outlets may meet in a common outlet manifold.

Such common outlet manifold may be arranged in the interface between the product supply pipe and the product inlet in the upper portion of the drum. The manifold may be arranged adjacent the product inlet in the upper portion of the drum and may distribute the product across a cross section of the drum as seen transverse the longitudinal extension thereof. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An evaporator, comprising:
    a drum having a first portion and a second portion, wherein the drum comprises:
        a product inlet positioned at the first portion of the drum;
        a product outlet positioned at the second portion of the drum;
        a vapor outlet; and
        an agitator;
    a heating jacket configured to surround the drum, wherein the heating jacket is further configured to heat a product in the drum; and
    a product supply pipe positioned outside the drum and extending from the second portion of the drum to the product inlet positioned at the first portion of the drum, wherein the product supply pipe is in direct contact with the heating jacket and in fluid communication with the product inlet.

2. The evaporator of claim 1, wherein the product supply pipe is formed as a tube coiling around and along a longitudinal extension of the drum.

3. The evaporator of claim 1, wherein the product supply pipe is formed as a tube coiling around and along an exterior side wall of the heating jacket.

4. The evaporator of claim 1, wherein:
the product supply pipe is formed as a tube coiling around and along a longitudinal extension of the drum;
the heating jacket is positioned as a tube coiling around and along the longitudinal extension of the drum; and
the tube forming the product supply pipe and the tube forming the heating jacket are positioned to coil side by side around and along the longitudinal extension of the drum.

5. The evaporator of claim 1, wherein:
the product supply pipe is formed by a double walled pre-heating jacket comprising two opposing wall portions; and
the double walled pre-heating jacket is configured to enclose the heating jacket and be in direct contact with the heating jacket.

6. The evaporator of claim 1, wherein the product supply pipe is integrated within the heating jacket.

7. The evaporator of claim 1, wherein an outer most wall of the product supply pipe is thermally insulated.

8. The evaporator of claim 1, wherein the product supply pipe comprises baffles.

9. The evaporator of claim 1, wherein the heating jacket is heated by electric heating elements or a heated fluid.

10. The evaporator of claim 1, wherein:
an interface between the product supply pipe and the product inlet at the first portion of the drum comprises a distributor adjacent the product inlet at the first portion of the drum; and
the distributor is configured to distribute the product across a cross section of the drum in a direction transverse a longitudinal extension of the drum.

* * * * *